United States Patent [19]
Sandman

[11] Patent Number: 5,862,622
[45] Date of Patent: Jan. 26, 1999

[54] FISHING ROD FLOTATION DEVICE AND METHOD OF INCREASING THE BUOYANCY OF A FISHING ROD

[76] Inventor: Joe Sandman, 412 Cook Rd., N.W., Resaca, Ga. 30735

[21] Appl. No.: 803,075

[22] Filed: Feb. 20, 1997

[51] Int. Cl.$^6$ .................................................. A01K 87/00
[52] U.S. Cl. ............................................................ 43/25
[58] Field of Search .......................... 43/25, 25.2; 441/6

[56] References Cited

U.S. PATENT DOCUMENTS

| | | | |
|---|---|---|---|
| 572,226 | 12/1896 | Spiegel | 43/25 |
| 3,131,503 | 5/1964 | Gottula | 43/26 |
| 4,709,500 | 12/1987 | Yasumiishi | 43/25 |
| 4,916,852 | 4/1990 | Zebleckis | 43/26 |
| 4,944,111 | 7/1990 | Daniel | 43/25.2 |
| 5,187,878 | 2/1993 | Kuttner | 43/25 |
| 5,293,711 | 3/1994 | Robinson | 43/26 |
| 5,503,579 | 4/1996 | Curran | 43/25 |
| 5,515,641 | 5/1996 | D'Alessandro | 43/26 |
| 5,592,773 | 1/1997 | Perry | 43/25 |

*Primary Examiner*—Kurt Rowan
*Attorney, Agent, or Firm*—Joseph N. Breaux

[57] ABSTRACT

A fishing rod flotation device including a buoyancy member constructed from a length of tubular plastic foam having a centrally located, cylindrically shaped, rod receiving cavity defined by a defining wall running the length thereof and a longitudinal insertion opening defined by a first and a second side edge, each of the first and second side edges running the entire length thereof; and at least two part securing mechanisms wherein one part of each two-part securing mechanism is attached adjacent to one of the first and second side edges. In a preferred embodiment a section of plastic film having a plurality of air bubbles formed therein is secured the defining wall of the rod receiving cavity. In a second aspect of the invention a method of increasing the buoyancy of a fishing rod is provided.

3 Claims, 2 Drawing Sheets

FISHING ROD FLOTATION DEVICE AND METHOD OF INCREASING THE BUOYANCY OF A FISHING ROD

TECHNICAL FIELD

The present invention relates to devices securable to a fishing rod to aid in retrieval of the rod should the rod be dropped into the water and methods of increasing the buoyancy of a fishing rod and more particularly to a tubular shaped, buoyant flotation device that is securable along the length of a fishing rod in a manner not to interfere with the operation of the fishing rod and a method of increasing the buoyancy of a fishing rod sufficiently to maintain the fishing rod at or near the surface of a body of water.

BACKGROUND OF THE INVENTION

Each year many fisherman lose valuable fishing rods when the fishing rods are accidentally dropped into a body of water or are pulled into the body of water by a fish. It would be a benefit, therefore, to have a flotation device that could be secured to the fishing rod without interfering with the operation of the fishing rod and that would provide sufficient buoyancy to the fishing rod to maintain at least a portion of the fishing rod at or near the surface of a body of water. It would also be a benefit to have a method for increasing the buoyancy of a fishing rod that allowed a user to provide increased buoyancy to a fishing rod to prevent loss of the fishing rod should the fishing rod be dropped or pulled into a body of water.

SUMMARY OF THE INVENTION

It is thus an object of the invention to provide a flotation device that is securable to a fishing rod.

It is a further object of the invention to provide a flotation device that is securable to a fishing rod in a manner such that operation of the fishing rod is not impaired.

It is a still further object of the invention to provide a flotation device that is securable to a fishing rod and has sufficient buoyancy to maintain at least a portion of the fishing rod at or near the surface of a body of water.

It is a still further object of the invention to provide a method for increasing the buoyancy of a fishing rod.

Accordingly, a fishing rod flotation device is provided. The fishing rod flotation device comprises a buoyancy member constructed from a length of tubular plastic foam having a centrally located, cylindrically shaped, rod receiving cavity defined by a defining wall running the length thereof and a longitudinal insertion opening defined by a first and a second side edge, each of the first and second side edges running the entire length thereof; and at least two two-part securing mechanisms wherein one part of each two-part securing mechanism is attached adjacent to one of the first and second side edges. In a preferred embodiment a section of plastic film having a plurality of air bubbles formed therein is secured to the defining wall of the rod receiving cavity. The plastic film provides increased buoyancy and provides a mechanism for sizing the flotation device to various sized rods by allowing the user to compress the air within the air bubbles by forcing the first and second side edges together or in the alternative to allow the user to rupture one or more of the air bubbles to provide addition space within the rod receiving cavity for receiving a section of the fishing rod.

In a second aspect of the invention a method of increasing the buoyancy of a fishing rod is provided. The method includes the steps of 1) providing a fishing rod flotation device comprising a buoyancy member constructed from a length of tubular, plastic foam having a centrally located, cylindrically shaped, rod receiving cavity defined by a defining wall running the length thereof and a longitudinal insertion opening defined by a first and a second side edge, each of the first and second side edges running the entire length thereof; and at least two two-part securing mechanisms wherein one part of each two-part securing mechanism is attached adjacent to one of the first and second side edges; 2) positioning a section of the fishing rod through the longitudinal insertion opening into the fishing rod receiving cavity; 3) forcing the first and second side edges toward each other; and 4) securing the first and second securing mechanism in a manner to maintain the tubular length of plastic foam on the section of the fishing rod. In a preferred embodiment of the method, the flotation device provided includes a section of plastic film having a plurality of air bubbles formed therein that is secured the defining wall of the rod receiving cavity and the method further includes the step of compressing the air contained within at least some of the air bubbles. In another preferred embodiment of the method, the flotation device provided includes a section of plastic film having a plurality of air bubbles formed therein that is secured the defining wall of the rod receiving cavity and the method further includes the step of rupturing one or more of the air bubbles to provide addition space within the rod receiving cavity for receiving the section of the fishing rod.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF THE EXEMPLARY EMBODIMENT

Figure 1:
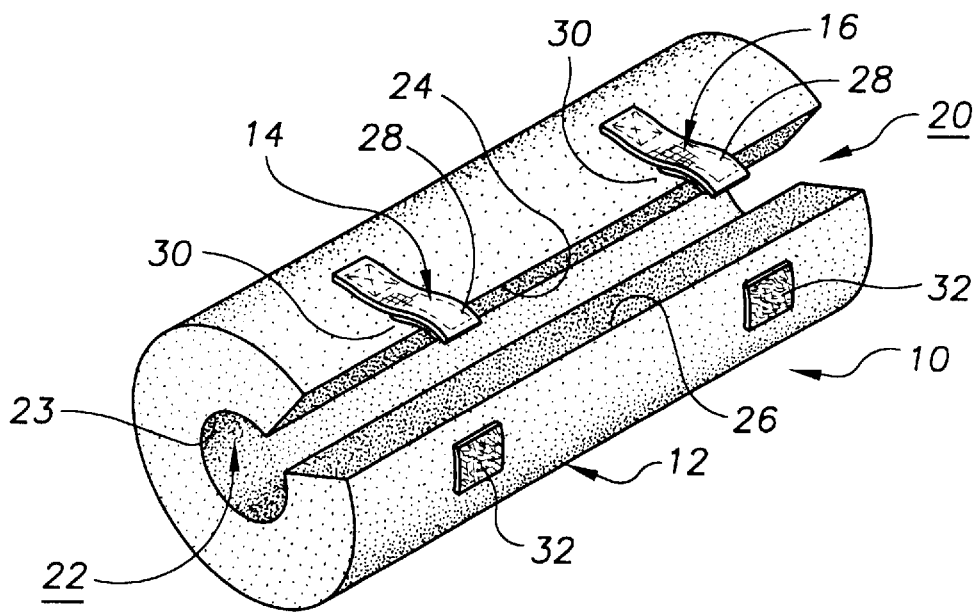
FIG. 1 is a is a perspective view showing a fist exemplary embodiment of the fishing rod flotation device of the present invention showing the tubular shaped buoyancy member, the longitudinal insertion opening the substantially cylindrical shaped rod cavity, and the two securing mechanisms.

FIG. 1 shows a first exemplary embodiment of the fishing rod flotation device of the present invention generally designated by the numeral 10. Rod flotation device 10 includes a buoyancy member, generally designated by the numeral 12; a first securing mechanism, generally designated by the numeral 14; and a second securing mechanism, generally designated by the numeral 16. In this embodiment, buoyancy member 12 is constructed from a five and one-half inch length of two inch diameter polyurethane foam tubing having a three-eighths inch internal diameter cylindrical shaped passageway running the entire length thereof. A longitudinal opening 20 is provided along the entire length of buoyancy member 12 to allow a section of a fishing rod to be laterally inserted into a cylindrically shaped rod receiving cavity 22. Cylindrically shaped rod receiving cavity is defined by a cavity defining wall 23. Longitudinal opening 20 is defined between a first side edge 24 and a second side edge 26.

First and second securing mechanisms 14,16 are identical. Each first and second securing mechanism includes a two inch long by one-half inch wide nylon strap 28 secured at one end to buoyancy member 12 adjacent to first side edge 24, a first section 30 of hook and pile fastener material secured to the opposite end of first nylon strap 28; and a second section of hook and pile material 32 secured to buoyancy member 12 adjacent to second side edge 26.

Figure 2:
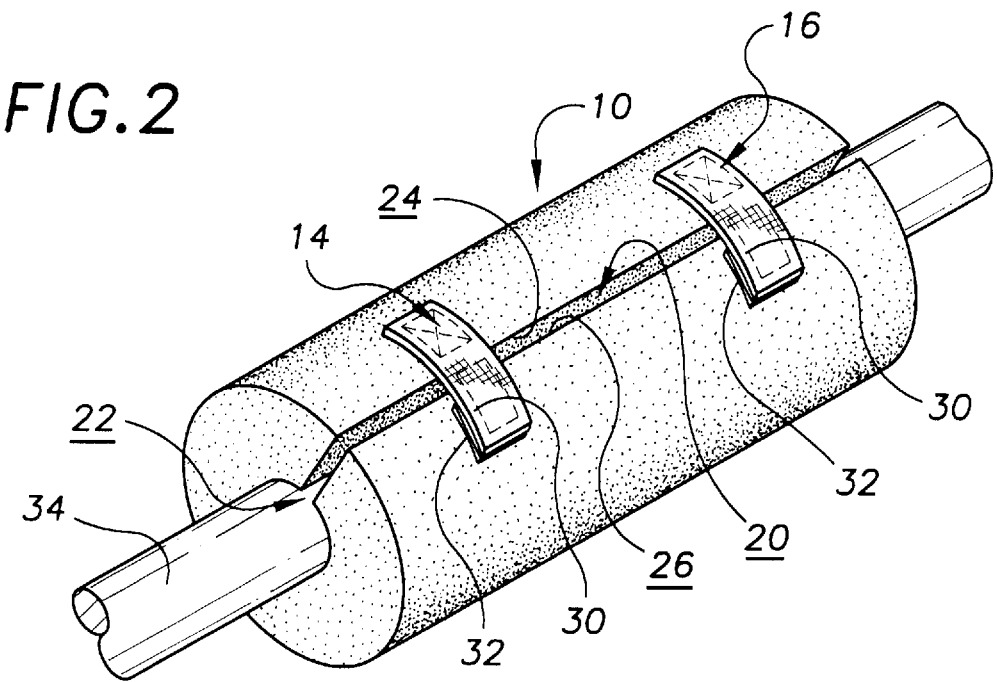
FIG. 2 is a perspective view showing the first exemplary embodiment of the fishing rod flotation device of FIG. 1 installed onto a section of a representative fishing rod.

Referring now to FIG. 2, fishing rod flotation device 10 is installed onto a fishing rod 34 by inserting the section of fishing rod 34 through longitudinal opening 20 and into rod receiving cavity 22, forcing first and second side edges 24,26 together until fishing rod 34 is gripped by buoyancy member 12 and then securing buoyancy member 12 to fishing rod 34 by attaching first and second sections 30,32 of first and second securing mechanism 14,16 together.

Figure 3:
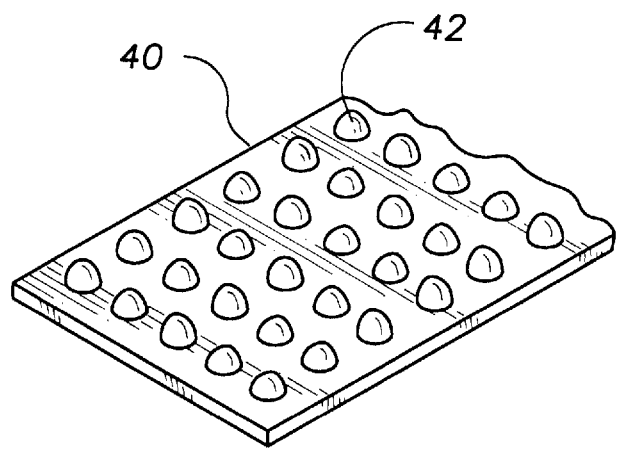
FIG. 3 is a perspective view of a section of bubble wrap material that is used to line the defining wall of the cylindrical shaped rod cavity in a second embodiment of the fishing rod flotation device of the present invention.
Figure 4:
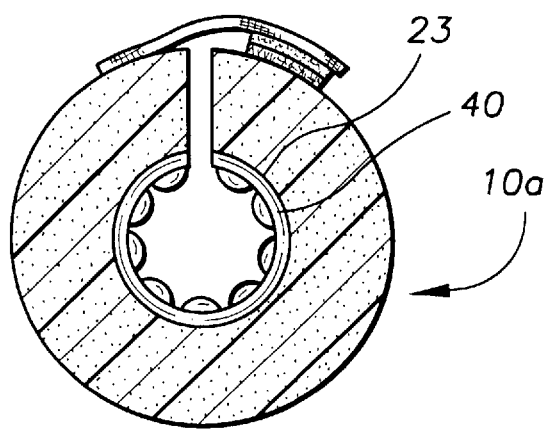
FIG. 4 is an end view of a second exemplary embodiment of the fishing rod flotation device of showing the bubble wrap of FIG. 3 adhesively secured to the defining wall of the cylindrical shaped rod receiving cavity.

FIG. 3 shows a section of plastic film 40 having a plurality of air bubbles 42 formed therein. Referring now to FIG. 4, plastic film 40 is used in a second exemplary embodiment of the fishing rod flotation device of the present invention, generally designated by the reference 10a. Rod flotation device 10a is identical to flotation device 10 (FIGS. 1 and 2) except that plastic film 40 is adhesively secured to cavity defining wall 23.

An exemplary embodiment of the method of increasing the buoyancy of a fishing rod is now described with general reference to FIGS. 1–4. In this exemplary method, the buoyancy of a representative fishing rod 34 is increased by 1) providing a fishing rod flotation device 10a; 2) sizing rod receiving cavity 22 by rupturing one or more air bubbles 42; 3) positioning a section of fishing rod 34 through longitudinal insertion opening 20 into fishing rod receiving cavity 22; 4) forcing first and second side edges 24,26 toward each other; and 5) securing first and second securing mechanisms 14,16 in a manner to maintain buoyancy member 12 on the section of fishing rod 34.

It can be seen from the preceding description that a flotation device has been provided that is securable to a fishing rod in a manner such that operation of the fishing rod is not impaired and that has sufficient buoyancy to maintain at least a portion of the fishing rod at or near the surface of a body of water. In addition, it can also be seen that a method for increasing the buoyancy of a fishing rod has been provided.

It is noted that the embodiments of the fishing rod flotation device and method for increasing the buoyancy of a fishing rod described herein in detail for exemplary purposes are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A fishing rod flotation device comprising:
   a buoyancy member constructed from a length of tubular plastic foam having a centrally located, cylindrically shaped, rod receiving cavity defined by a defining wall running the length thereof and a longitudinal insertion opening defined by a first and a second side edge, each of the first and second side edges running the entire length thereof; and
   at least two two-part securing mechanisms wherein one part of each two-part securing mechanism is attached adjacent to one of said first and second side edges;
   said buoyancy member further including a section of plastic film having a plurality of air bubbles formed therein, said section of plastic film being secured to said defining wall of said rod receiving cavity.

2. A method of increasing the buoyancy of a fishing rod comprising the steps of:
   1) providing a fishing rod flotation device comprising a buoyancy member constructed from a length of tubular, plastic foam having a centrally located, cylindrically shaped, rod receiving cavity defined by a defining wall running the entire length thereof and a longitudinal insertion opening defined by a first and a second side edge, each of said first and second side edges running the said entire length thereof, a section of plastic film having a plurality of air bubbles formed therein secured to said defining wall of said rod receiving cavity;
   and at least two two-part securing mechanisms, one part of each said two-part securing mechanism being attached adjacent to one of said first and second side edges;
   2) positioning a section of said fishing rod through said longitudinal insertion opening into said fishing rod receiving cavity;
   3) forcing said first and second side edges toward each other;
   4) securing said first and second securing mechanism in a manner to maintain said buoyancy member on said section of said fishing rod; and
   5) compressing said air contained within at least some of said air bubbles.

3. A method of increasing the buoyancy of a fishing rod comprising the steps of:
   1) providing a fishing rod flotation device comprising a buoyancy member constructed from a length of tubular, plastic foam having a centrally located, cylindrically shaped, rod receiving cavity defined by a defining wall running the entire length thereof and a longitudinal insertion opening defined by a first and a second side edge, each of said first and second side edges running the said entire length thereof, a section of plastic film having a plurality of air bubbles formed therein secured to said defining wall of said rod receiving cavity;
   and at least two two-part securing mechanisms, one part of each said two-part securing mechanism being attached adjacent to one of said first and second side edges;
   2) positioning a section of said fishing rod through said longitudinal insertion opening into said fishing rod receiving cavity;
   3) forcing said first and second side edges toward each other;
   4) securing said first and second securing mechanism in a manner to maintain said buoyancy member on said section of said fishing rod; and
   5) rupturing one or more of said air bubbles to provide addition space within said rod receiving cavity for receiving said section of said fishing rod.

\* \* \* \* \*